(12) United States Patent
Hon

(10) Patent No.: US 8,653,178 B2
(45) Date of Patent: Feb. 18, 2014

(54) HIGH WEAR-RESISTANT NYLON COMPOSITE MATERIAL FOR ROLLERS ON AIRPORT FREIGHT VEHICLES AND PREPARATION METHOD THEREOF

(75) Inventor: Ching Fong Hon, Hong Kong (HK)

(73) Assignee: Easyroll Technology (HK) Limited, NT (HK)

( * ) Notice: Subject to any disclaimer, the term of this patent is extended or adjusted under 35 U.S.C. 154(b) by 224 days.

(21) Appl. No.: 13/266,458

(22) PCT Filed: Apr. 27, 2010

(86) PCT No.: PCT/CN2010/072234
§ 371 (c)(1),
(2), (4) Date: Oct. 27, 2011

(87) PCT Pub. No.: WO2010/127596
PCT Pub. Date: Nov. 11, 2010

(65) Prior Publication Data
US 2012/0053273 A1    Mar. 1, 2012

(30) Foreign Application Priority Data

May 4, 2009 (HK) .................................. 09104100.0
Aug. 25, 2009 (HK) .................................. 09107826.6

(51) Int. Cl.
*C08K 3/40* (2006.01)
*C08L 51/00* (2006.01)
*C08L 77/00* (2006.01)

(52) U.S. Cl.
USPC ........... 524/504; 523/214; 524/222; 524/394; 524/400; 524/514

(58) Field of Classification Search
USPC ........... 524/514, 222, 394, 400, 504; 523/214
See application file for complete search history.

(56) References Cited

FOREIGN PATENT DOCUMENTS

| CN | 1607219 | 4/2005 |
| CN | 1854190 | 11/2006 |
| CN | 1995142 | 7/2007 |
| CN | 101182388 | 5/2008 |
| CN | 101314672 | 12/2008 |
| EP | 346825 A | * 12/1989 |
| EP | 0570632 | 11/1993 |

OTHER PUBLICATIONS

Derwent abstract 1986-223567 for RO 88741 A, Feb. 28, 1986.*
Machine translation of CN 101182388 A, Dec. 11, 2007.*
Machine translation of CN 101314672 A, Dec. 3, 2008.*
Database WPI Week 200915 Thomson Scientific, London, GB; AN 2009-B45445 XP002686073.

* cited by examiner

*Primary Examiner* — Vickey Nerangis

(57) ABSTRACT

A high wear-resistant nylon composite material for rollers of an airport freight vehicle and a preparation method thereof are disclosed. The composite material includes the following materials as the main components, 60-80 wt % of nylon 6 or nylon 66 or a mixture of nylon 6 and nylon 66, 5-13 wt % of glass beads, 6-14 wt % of glass fiber powder, 5-7 wt % of lubricating anti-wear agent. The composite material further includes the following materials as the auxiliary materials, 3-5 wt % of graft type toughening modifying agent, 0.3-1 wt % of antioxidant, 0.2-0.3 wt % of lubricating dispersant and 0.2-0.5 wt % of nucleating agent. The composite has characteristics such as high wear resistance, high heat resistance, relatively high toughness and skid resistance.

11 Claims, 1 Drawing Sheet

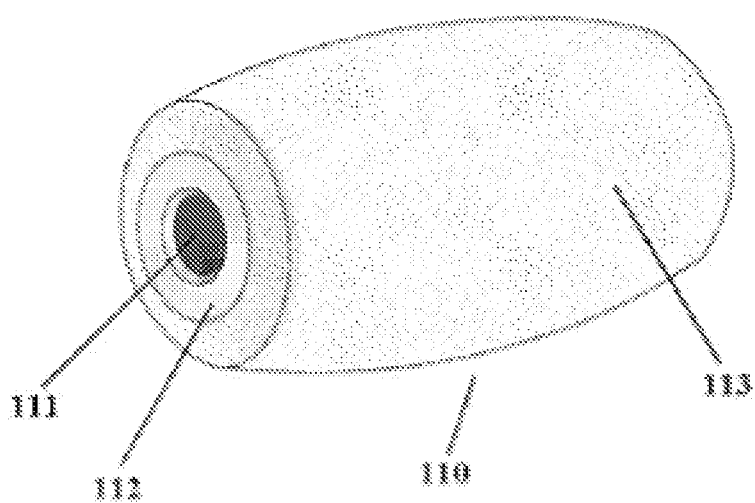

HIGH WEAR-RESISTANT NYLON COMPOSITE MATERIAL FOR ROLLERS ON AIRPORT FREIGHT VEHICLES AND PREPARATION METHOD THEREOF

FIELD OF THE PATENT APPLICATION

The present patent application relates to nylon composite materials and preparation methods thereof, and more particularly, to a high wear-resistant nylon composite material for rollers on an airport freight vehicle and a preparation method thereof.

BACKGROUND

Polyamide (PA) is commonly known as nylon, and amide groups of the polyamide are polarized and can form a hydrogen bond, and hence polyamide has excellent mechanical properties, and is a type of engineering plastics with good shock resistance and relatively strong toughness. This material is characterized by: 1. high crystallinity, high surface hardness, high wear resistance, small friction coefficient, good self-lubricating and silencing properties; 2. good low temperature performance and heat resistance; 3. non-toxicity, odorlessness, non-putridness, being self-extinguishing, good weather resistance, but poor dyeability; 4. good chemical stability, good seawater resistance, good solvent resistance, good oil resistance, but poor acid resistance; 5. good electrical insulation, which, however, is susceptible to temperature; 6. great water absorbing capability, and its dimensional stability and electrical properties being susceptible to water.

Nylon 6 (PA6) and nylon 66 (PA66) are the main varieties of nylon. Nylon 6 also has good physical, mechanical properties, such as high tensile strength, excellent abrasion resistance, impact resistance, outstanding chemical resistance and oil resistance. Nylon 66 is a kind of uniform thermoplastic high molecular polymers with symmetrical molecular structure containing six methylene, having high strength, wear resistance, solvent resistance, good self-lubricating characteristic, wide usage temperature range and other advantages, and being one kind of the engineering plastics that are relatively widely used.

Since nylon has excellent performance, nylon is widely used in industrial manufacturing, such as automobiles, instruments and meters, machineries, textiles and so on. The material is mostly used as components and structural parts. However, its great water absorbing capability and poor dimensional stability limits it from wider usage. The water absorbing capability of nylon can be reduced by filling enhancement modifier, so as to ensure that nylon works in highly hot and humid conditions, and in the meanwhile to increase rigidity, to reduce the high temperature creep degeneration and shrinkage rate, and to improve the dimensional stability, the impact strength, the abrasion resistance and the flame resistance. Generally, the enhancement modifier is mainly glass fibers, and the amount of the added glass fibers has a relatively large impact on the mechanical properties (large impact, tensile, and bending strength) of the composite material.

As being well known, rollers need to be mounted on lifting platform vehicles as the existing airport transportation equipment. The rollers can push a container and a container board by a roller shaft to move back and forth, left and right, or rotate. A roller made of aluminum alloy or other metal alloy provided by the existing technology is not reasonable, because the same metal has large intersolubility, and is easy to adhere and thereby be worn. In addition, there are two different mechanisms for abrasion of aluminum alloy under different loads. Aluminum alloy worn under low load is referred as slight abrasion or oxidation abrasion. The surface of aluminum alloy forms a layer of dense oxide film, and the thickness of the oxide film is up to about 2 μm. The layer of the oxide film is ruptured and falling off under the action of friction forces, thereby producing some shredded shaped worn debris. Especially, the rollers are prone to skid during the raining days. Consequently, the freights being transported are out of control, and the freights need to be manually pushed to be adjusted to the right direction. Many accidents occur every year in which the workers are injured due to slipping and falling when pushing the freights. In addition, the existing rollers made of aluminum alloy are prone to wear the bottom board of the container and the container board, and to generate too much noise when friction occurs, thereby causing damages to human ears.

SUMMARY

The technical problem that the present patent application is intended to solve is to provide a high wear-resistant nylon composite material for rollers on an airport freight vehicle and a preparation method thereof.

To solve the above-mentioned technical problem, the present patent application provides a first high wear-resistant nylon composite material for rollers on an airport freight vehicle. The high wear-resistant nylon composite material includes:

60-80 wt % of nylon 6;
5-13 wt % of glass beads;
6-14 wt % of glass fiber powder;
5-7 wt % of lubricating anti-wear agent;
3-5 wt % of graft type toughening modifying agent;
0.3-1 wt % of antioxidant;
0.2-0.3 wt % of lubricating dispersant; and
0.2-0.5 wt % of nucleating agent.

In addition, the present patent application provides a second high wear-resistant nylon composite material for rollers on an airport freight vehicle. The high wear-resistant nylon composite material includes:

60-80 wt % of nylon 66;
5-13 wt % of glass beads;
6-14 wt % of glass fiber powder;
5-7 wt % of lubricating anti-wear agent;
3-5 wt % of graft type toughening modifying agent;
0.3-1 wt % of antioxidant;
0.2-0.3 wt % of lubricating dispersant; and
0.2-0.5 wt % of nucleating agent.

Further, the present patent application provides a third high wear-resistant nylon composite material for rollers on an airport freight vehicle is provided. The high wear-resistant nylon composite material includes:

18-41 wt % of nylon 6;
28-42 wt % of nylon 66;
5-13 wt % of glass beads;
6-14 wt % of glass fiber powder;
5-7 wt % of lubricating anti-wear agent;
3-5 wt % of graft type toughening modifying agent;
0.3-1 wt % of antioxidant;
0.2-0.3 wt % of lubricating dispersant; and
0.2-0.5 wt % of nucleating agent.

Furthermore, the present patent application provides a fourth high wear-resistant nylon composite material for rollers on an airport freight vehicle is provided. The high wear-resistant nylon composite material includes:

60-80 wt % of nylon 6, or nylon 66, or a mixture of nylon 6 and nylon 66;
5-16 wt % of glass beads;
6-18 wt % of glass fiber powder;
5-7 wt % of lubricating anti-wear agent.

Preferably, the lubricating anti-wear agent is selected from the group consisting of ultra-high molecular weight polyethylene, PTFE (Polytetrafluoroethylene), and any combination thereof.

Preferably, the surfaces of the glass beads and the glass fiber powder are treated by a silane coupling agent.

Preferably, the fourth high wear-resistant nylon composite material further includes graft type toughening modifying agent, and the graft type toughening modifying agent is present in an amount of 3-5 wt %.

Preferably, the graft type toughening modifying agent is graft polymerization oligomer with polyolefin elastomer (POE) grafted unsaturated acid or acid anhydride, and the melt index of the graft type toughening modifying agent is 1.0-5.0 g/10 min and the graft rate of the graft type toughening modifying agent is 0.5-1%.

Preferably, the graft polymerization oligomer with polyolefin elastomer (POE) grafted unsaturated acid or acid anhydride is maleic anhydride grafted polyolefin elastomer (POE) with a melt index of 2 g/10 min and a graft rate of 0.8%.

Preferably, the fourth high wear-resistant nylon composite material further includes antioxidant, and the antioxidant is present in an amount of 0.3-1 wt %.

Preferably, the antioxidant is a mixed system with hindered phenolic antioxidant and phosphite ester antioxidant.

Preferably, the mixed system with hindered phenolic antioxidant and phosphite ester antioxidant is antioxidant 1098/antioxidant 168 having a weight ratio of 1:1.

Preferably, the fourth high wear-resistant nylon composite material further includes lubricating dispersant, and the lubricating dispersant is present in an amount of 0.2-0.3 wt %.

Preferably, the lubricating dispersant is stearate.

Preferably, the stearate is selected from the group consisting of calcium stearate, zinc stearate, aluminum stearate and any combination thereof.

Preferably, the fourth high wear-resistant nylon composite material further includes nucleating agent, and the nucleating agent is present in an amount of 0.2-0.5 wt %.

Preferably, the nucleating agent is a commercially available nucleating agent P-20.

Preferably, the fourth high wear-resistant nylon composite material includes:
69-73 wt % of nylon 6, or nylon 66, or a mixture of nylon 6 and nylon 66;
5-12 wt % of glass beads;
10-17 wt % of glass fiber powder;
5-6 wt % of lubricating anti-wear agent.

Furthermore, the present patent application provides a preparation method of the first high wear-resistant nylon composite material. The method includes the following steps: weighing up the following ingredients according to the following weight percentages, 60-80 wt % of the nylon 6, 5-13 wt % of the glass beads, 6-14 wt % of the glass fiber powder, 5-7 wt % of the lubricating anti-wear agent, 3-5 wt % of the graft type toughening modifying agent, 0.3-1 wt % of the antioxidant, 0.2-0.3 wt % of the lubricating dispersant and 0.2-0.5 wt % of the nucleating agent; and
placing the above ingredients in a high speed mixing machine to mix the ingredients and form a uniform mixture, transferring the mixture to an extruder to extrude and granulate the mixture at a processing temperature of 210-290° C.

Furthermore, the present patent application provides a preparation method of the second high wear-resistant nylon composite material. The method includes the following steps: weighing up the following ingredients according to the following weight percentages, 60-80 wt % of the nylon 66, 5-13 wt % of the glass beads, 6-14 wt % of the glass fiber powder, 5-7 wt % of the lubricating anti-wear agent, 3-5 wt % of the graft type toughening modifying agent, 0.3-1 wt % of the antioxidant, 0.2-0.3 wt % of the lubricating dispersant and 0.2-0.5 wt % of the nucleating agent; and
placing the above ingredients in a high speed mixing machine to mix the ingredients and form a uniform mixture, transferring the mixture to an extruder to extrude and granulate the mixture at a processing temperature of 210-290° C.

Furthermore, the present patent application provides a preparation method of the third high wear-resistant nylon composite material. The method includes the following steps: weighing up the following ingredients according to the following weight percentages, 18-41 wt % of the nylon 6, 28-42 wt % of the nylon 66, 5-13 wt % of the glass beads, 6-14 wt % of the glass fiber powder, 5-7 wt % of the lubricating anti-wear agent, 3-5 wt % of the graft type toughening modifying agent, 0.3-1 wt % of the antioxidant, 0.2-0.3 wt % of the lubricating dispersant and 0.2-0.5 wt % of the nucleating agent; and
placing the above ingredients in a high speed mixing machine to mix the ingredients and form a uniform mixture, transferring the mixture to an extruder to extrude and granulate the mixture at a processing temperature of 210-290° C.

Furthermore, the present patent application provides a preparation method of the fourth high wear-resistant nylon composite material. The method includes the following steps: weighing up the following ingredients according to the following weight percentages, 60-80 wt % of the nylon 6 or the nylon 66 or the mixture of the nylon 6 and the nylon 66, 5-16 wt % of the glass beads, 6-18 wt % of the glass fiber powder, 5-7 wt % of the lubricating anti-wear agent; and
placing the above ingredients in a high speed mixing machine to mix the ingredients and form a uniform mixture, transferring the mixture to an extruder to extrude and granulate the mixture at a processing temperature of 210-290° C.

According to the present patent application, another preparation method of the high wear-resistant nylon composite material is provided, and the method includes the following steps:
weighing up the following ingredients according to the following weight percentages, 60-80 wt % of the nylon 6 or the nylon 66 or the mixture of the nylon 6 and the nylon 66, 5-13 wt % of the glass beads, 6-14 wt % of the glass fiber powder, 5-7 wt % of the lubricating anti-wear agent, 3-5 wt % of the graft type toughening modifying agent, 0.3-1 wt % of the antioxidant, 0.2-0.3 wt % of the lubricating dispersant and 0.2-0.5 wt % of the nucleating agent; and
placing the above ingredients in a high speed mixing machine to mix the ingredients and form a uniform mixture, transferring the mixture to an extruder to extrude and granulate the mixture at a processing temperature of 210-290° C.

Compared with the existing technology, the high wear-resistant nylon 6, nylon 66 and nylon 6/nylon 66 composite material in accordance with the present patent application have advantages such as high coefficients of friction, being not easy to wear, high toughness, exceptionally high stiffness, and being capable of withstanding relatively large impact, and are very suitable for the manufacturing of the rollers on freight vehicles. The rollers made by the high wear-resistant composite materials have high toughness, exceptionally high stiffness, and are capable of withstanding relatively large impact. In addition, besides that the composite materials have skid resistance, the frosted texture of the outer surface of the rollers can provide additional skid resistance.

BRIEF DESCRIPTIONS OF THE DRAWINGS

FIG. 1 is a perspective view of a roller on a lifting platform device of an airport freight vehicle made by a high wear-resistant nylon composite material in accordance with an embodiment of the present patent application.

DETAILED DESCRIPTION

Reference will now be made in detail to a preferred embodiment of the high wear-resistant nylon composite material for rollers on an airport freight vehicle and the preparation method thereof disclosed in the present patent application, examples of which are also provided in the following description. Exemplary embodiments of the high wear-resistant nylon composite material for rollers on an airport freight vehicle and the preparation method thereof disclosed in the present patent application are described in detail, although it will be apparent to those skilled in the relevant art that some features that are not particularly important to an understanding of the high wear-resistant nylon composite material for rollers on an airport freight vehicle and the preparation method thereof may not be shown for the sake of clarity.

Furthermore, it should be understood that the high wear-resistant nylon composite material for rollers on an airport freight vehicle and the preparation method thereof disclosed in the present patent application is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure.

The present patent application relates to a high wear-resistant nylon 6 composite material and a preparation method thereof.

Embodiments 1-6

The high wear-resistant nylon 6 (PA6) composite material includes a main material and a secondary material. The main material includes nylon 6 (PA6), glass beads (GB), glass fiber powder (GF) and lubricating anti-wear agent. The high wear-resistant nylon 6 composite material consists of the following components and their weight percentages are shown in Table 1.

In the above embodiments, the viscosity of the nylon 6 is 2.4; the glass beads and the glass fiber powder are respectively non alkali glass beads and non alkali glass fiber powder whose surfaces are both treated by the silane coupling agent; the ultra-high molecular weight polyethylene is referred as a first lubricating anti-wear agent, and the PTFE is referred as a second lubricating anti-wear agent; the graft type toughening modifying agent is graft polymerization oligomer with polyolefin elastomer (POE) grafted unsaturated acid or acid anhydride with a melt index of 1.0-5.0 g/10 min and a graft rate of 0.5-1%. Further, the graft type toughening modifying agent is maleic anhydride grafted polyolefin elastomer (POE) with a melt index of 2 g/10 min and a graft rate of 0.8%. The antioxidant is a mixed system with hindered phenolic antioxidant and phosphite ester antioxidant. For example, the antioxidant is 1098/168 (weight ratio being 1:1): 1098 is N,N'-1,6-sub-hexyl-II-[3,5-di-tert-butyl-4-hydroxyphenyl propionamide], and 168 is tri (2,4-ditertrabutyl phenyl) phosphite ester. The lubricating dispersant may be a stearate which is selected from the group consisting of calcium stearate, zinc stearate, aluminum stearate and any combination thereof. In the embodiments, the lubricating dispersant is calcium stearate. The nucleating agent is calcium carboxylates with a long carbon chain as a main component, such as a commercially available nucleating agent P-20, and the P-20 may be produced by Clariant International Ltd. in Germany.

The above components are proportionately placed in a high speed mixing machine to be mixed for 5-10 minutes and thereby to form a mixture, and then the mixture is sent out to a screw extruder to extrude and granulate the mixture at a processing temperature 210-255° C. The screw rotational speed of the screw extruder is in the range of 400-600 rpm.

TABLE 1

| Ingredient Name | Formula 1 (wt %) | Formula 2 (wt %) | Formula 3 (wt %) | Formula 4 (wt %) | Formula 5 (wt %) | Formula 6 (wt %) |
|---|---|---|---|---|---|---|
| Nylon 6 (PA6) | 60 | 80 | 69 | 69 | 69 | 73 |
| Glass beads (GB) | 13 | 5 | 10 | 10 | 10 | 10 |
| Glass fiber powder (GF) | 14 | 6 | 10 | 10 | 10 | 10 |
| Ultra-high molecular weight polyethylene (UHMWPE) | 7 | 0 | 6 | 0 | 3 | 3 |
| Polytetrafluoro ethylene (PTFE) | 0 | 5 | 0 | 6 | 3 | 3 |
| Graft type toughening modifying agent (POE-g-MAH) | 5 | 3 | 4 | 4 | 4 | 0 |
| Antioxidant 1098/168 (1:1) | 0.5 | 0.5 | 0.5 | 0.5 | 0.5 | 0.5 |
| Lubricating dispersant (Calcium stearate) | 0.3 | 0.3 | 0.3 | 0.3 | 0.3 | 0.3 |
| Nucleating agent (P-20) | 0.2 | 0.2 | 0.2 | 0.2 | 0.2 | 0.2 |

TABLE 2

The heating temperature in various sections

| | a first section | a second section | a third section | a fourth section | a fifth section | a sixth section | a seventh section | an eighth section | a ninth section |
|---|---|---|---|---|---|---|---|---|---|
| the heating temperature (° C.) | 210 | 215 | 225 | 235 | 235 | 235 | 235 | 235 | 225 |

According to the samples 1-6 prepared in the embodiments 1-6, the mechanical performances of the samples 1-6 are tested and compared using ASTM standards.

TABLE 3

Test performance comparison

| Items | Sample 1 | Sample 2 | Sample 3 | Sample 4 | Sample 5 | Sample 6 |
|---|---|---|---|---|---|---|
| Tensile strength (Mpa) | 115 | 113 | 115 | 112 | 123 | 135 |
| Flexural strength (Mpa) | 135 | 139 | 135 | 131 | 145 | 158 |
| Impact strength at room temperature (J/M) | 100 | 82 | 94 | 98 | 105 | 58 |
| Wear coefficient | 0.14 | 0.22 | 0.2 | 0.21 | 0.13 | 0.11 |
| Heat deformation temperature (° C.) | 228 | 213 | 226 | 222 | 230 | 235 |

Embodiment 7

The present patent application further provides a preparation method of the high wear-resistant nylon 6 composite material. The preparation method includes the following steps:
Step one: weighing up the following ingredients according to the following weight percentages, 69 wt % of the nylon 6, 10 wt % of the glass beads treated by the silane coupling agent, 10 wt % of the glass fiber powder treated by the silane coupling agent, 3 wt % of the first lubricating anti-wear agent (ultra-high molecular weight polyethylene), 3 wt % of the second lubricating anti-wear agent (PTFE); 4 wt % of the graft type toughening modifying agent, 0.5 wt % of the mixed antioxidant 1098/168 (weight ratio 1:1), 0.2 wt % of the lubricating dispersant and 0.3 wt % of the nucleating agent;
Step two: placing the above ingredients in a high speed mixing machine to mix the ingredients for 5 minutes and thereby form a mixture, and then transferring the mixture to a twin-screw extruder to extrude and granulate the mixture at a processing temperature of 215-245° C., the screw rotational speed of the twin-screw extruder being 600 rpm.
The graft type toughening modifying agent is graft polymerization oligomer with polyolefin elastomer (POE) grafted unsaturated acid or acid anhydride. Further, the graft type toughening modifying agent is polyolefin elastomer (POE) grafted maleic acid anhydride with a melt index of 2 g/10 min and a graft rate of 0.5-1%.

Embodiment 8

The present patent application further provides another preparation method of the high wear-resistant nylon 6 composite material.

The preparation method includes the following steps:
Step one: weighing up the following ingredients according to the following weight percentages, 70 wt % of the nylon 6, 10 wt % of the glass beads treated by the silane coupling agent, 10 wt % of the glass fiber powder treated by the silane coupling agent, 3 wt % of the graft type toughening modifying agent, 3 wt % of the first lubricating anti-wear agent (ultra-high molecular weight polyethylene), 3 wt % of the second lubricating anti-wear agent (PTFE), 0.3 wt % of the mixed antioxidant 1098/168 (weight ratio 1:1), 0.2 wt % of the lubricating dispersant (calcium stearate) and 0.5 wt % of the nucleating agent;
Step two: placing the above ingredients in a high speed mixing machine to mix the ingredients for 3 minutes and thereby form a mixture, and then transferring the mixture to a twin-screw extruder to extrude and granulate the mixture at a processing temperature of 210-235° C., the screw rotational speed of the twin-screw extruder being 550 rpm.

Embodiment 9

The present patent application further provides another preparation method of the high wear-resistant nylon 6 composite material.
The preparation method includes the following steps:
Step one: weighing up the following ingredients according to the following weight percentages, 67.2 wt % of the nylon 6, 10 wt % of the glass beads treated by s the ilane coupling agent, 10 wt % of the glass fiber powder treated by the silane coupling agent, 3 wt % of the first lubricating anti-wear agent (ultra-high molecular weight polyethylene), 3 wt % of the second lubricating anti-wear agent (PTFE), 5 wt % of the graft type toughening modifying agent, 1 wt % of the mixed antioxidant 1098/168 (weight ratio 1:1), 0.3 wt % of the lubricating dispersant (calcium stearate) and 0.5 wt % of the nucleating agent;
Step two: placing the above ingredients in a high speed mixing machine to mix the ingredients for 3 minutes and thereby form a mixture, and then transferring the mixture to a twin-screw extruder to extrude and granulate the mixture at a processing temperature of 210-235° C., the screw rotational speed of the twin-screw extruder being 550 rpm.
The present patent application further provides a high wear-resistant nylon 66 composite material and the preparation method thereof.

Embodiments 10-15

The high wear-resistant nylon 66 (PA66) composite material includes a main material and a secondary material. The main material includes nylon 66 (PA66), glass beads (GB), glass fiber powder (GF) and lubricating anti-wear agent. The high wear-resistant nylon 66 composite material consists of the following components and their weight percentages are shown in Table 4.

TABLE 4

Formulas 10-15

| Ingredient Name | Formula 10 (wt %) | Formula 11 (wt %) | Formula 12 (wt %) | Formula 13 (wt %) | Formula 14 (wt %) | Formula 15 (wt %) |
| --- | --- | --- | --- | --- | --- | --- |
| Nylon 66 (PA66) | 60 | 80 | 69 | 69 | 69 | 73 |
| Glass beads (GB) | 13 | 5 | 10 | 10 | 10 | 10 |
| Glass fiber powder (GF) | 14 | 6 | 10 | 10 | 10 | 10 |
| Ultra-high molecular weight polyethylene (UHMWPE) | 7 | 0 | 6 | 0 | 3 | 3 |
| PTFE | 0 | 5 | 0 | 6 | 3 | 3 |
| Graft type toughening modifying agent (POE-g-MAH) | 5 | 3 | 4 | 4 | 4 | 0 |
| Antioxidant 1098/168 (1:1) | 0.5 | 0.5 | 0.5 | 0.5 | 0.5 | 0.5 |
| Lubricating dispersant (Calcium stearate) | 0.3 | 0.3 | 0.3 | 0.3 | 0.3 | 0.3 |
| Nucleating agent (P-20) | 0.2 | 0.2 | 0.2 | 0.2 | 0.2 | 0.2 |

In the above embodiments, the viscosity of the nylon 66 is 2.4; the glass beads and glass fiber powder are respectively non alkali glass beads and non alkali glass fiber powder whose surfaces are both treated by the silane coupling agent; the ultra-high molecular weight polyethylene is referred as a first lubricating anti-wear agent, and the PTFE is referred as a second lubricating anti-wear agent; the graft type toughening modifying agent is graft polymerization oligomer with polyolefin elastomer (POE) grafted unsaturated acid or acid anhydride with a melt index of 1.0-5.0 g/10 min and a graft rate of 0.5-1%. The antioxidant is a mixed system with hindered phenolic antioxidant and phosphite ester antioxidant. For example, the antioxidant is 1098/168 (weight ratio 1:1), wherein 1098 is N,N'-1,6-sub-hexyl-II-[3,5-di-tert-butyl-4-hydroxyphenyl propionamide], and 168 is tri (2,4-ditertrabutyl phenyl) phosphite ester. The lubricating dispersant is a stearate which is selected from the group consisting of calcium stearate, zinc stearate, aluminum stearate any combination thereof. In the above embodiments, the lubricating dispersant is calcium stearate. The nucleating agent is calcium carboxylates with a long carbon chain as a main component, such as a commercially available nucleating agent P-20, and the P-20 may be produced by Clariant International Ltd. in Germany.

The above components are proportionately placed in a high speed mixing machine to be mixed for 5-10 minutes and thereby form a mixture, and then the mixture is sent out to a screw extruder to extrude and granulate the mixture at a processing temperature of 245-290° C. The screw rotational speed of the screw extruder is 400-600 rpm.

TABLE 5

The heating temperature in various sections

| | sections | | | | | | | | |
| --- | --- | --- | --- | --- | --- | --- | --- | --- | --- |
| | a first section | a second section | a third section | a fourth section | a fifth section | a sixth section | a seventh section | an eighth section | a ninth section |
| the heating temperature (° C.) | 260 | 265 | 270 | 270 | 270 | 265 | 265 | 265 | 265 |

According to samples 10-15 prepared in embodiments 10-15, the mechanical performances of the samples 10-15 are tested and compared using ASTM standards.

TABLE 6

Test performance comparison

| Items | Sample 10 | Sample 11 | Sample 12 | Sample 13 | Sample 15 | Sample 15 |
| --- | --- | --- | --- | --- | --- | --- |
| Tensile strength (Mpa) | 119 | 113 | 115 | 112 | 123 | 135 |
| Flexural strength (Mpa) | 160 | 149 | 155 | 151 | 165 | 178 |
| Impact strength at room temperature (J/M) | 105 | 83 | 92 | 99 | 119 | 65 |
| Wear coefficient | 0.14 | 0.22 | 0.2 | 0.21 | 0.13 | 0.11 |
| Heat deformation temperature (° C.) | 248 | 233 | 236 | 232 | 242 | 255 |

Embodiment 16

The present patent application further provides a preparation method of the high wear-resistant nylon 66 composite material. The preparation method includes the following steps:

Step one: weighing up the following ingredients according to the following weight percentages, 69 wt % of the nylon 66, 10 wt % of the glass beads treated by the silane coupling agent, 10 wt % of the glass fiber powder treated by the silane coupling agent, 3 wt % of the first lubricating anti-wear agent (ultra-high molecular weight polyethylene), 3 wt % of the second lubricating anti-wear agent (PTFE); 4 wt % of the graft type toughening modifying agent, 0.5 wt % of the mixed antioxidant 1098/168 (weight ratio 1:1), 0.2 wt % of the lubricating dispersant such as calcium stearate and 0.3 wt % of the nucleating agent;

Step two: placing the above ingredients in a high speed mixing machine to mix the ingredients for 5 minutes and thereby form a mixture, and then transferring the mixture to a twin-screw extruder to extrude and granulate the mixture at a processing temperature of 250-265° C., the screw rotational speed of the twin-screw extruder being 600 rpm.

The graft type toughening modifying agent is graft polymerization oligomer with polyolefin elastomer (POE) grafted unsaturated acid or acid anhydride. Further, the graft type toughening modifying agent is polyolefin elastomer (POE) grafted maleic acid anhydride with a melt index of 2 g/10 min and a graft rate of 0.5-1%.

Embodiment 17

The present patent application further provides another preparation method of the high wear-resistant nylon 66 composite material. The preparation method includes the following steps:

Step one: weighing up the following ingredients according to the following weight percentages, 73 wt % of the nylon 66, 10 wt % of the glass beads treated by the silane coupling agent, 10 wt % of the glass fiber powder treated by the silane coupling agent, 3 wt % of the graft type toughening modifying agent, 3 wt % of the first lubricating anti-wear agent (ultra-high molecular weight polyethylene), 3 wt % of the second lubricating anti-wear agent (PTFE), 0.3 wt % of the mixed antioxidant 1098/168 (weight ratio 1:1), 0.2 wt % of the lubricating dispersant (calcium stearate) and 0.5 wt % of the nucleating agent;

Step two: placing the above ingredients in a high speed mixing machine to mix the ingredients for 3 minutes and thereby form a mixture, and then transferring the mixture to a twin-screw extruder to extrude and granulate the mixture at a processing temperature of 245-270° C., the screw rotational speed of the twin-screw extruder being 550 rpm.

Embodiment 18

The present patent application further provides another preparation method of the high wear-resistant nylon 66 composite material. The preparation method includes the following steps:

Step one: weighing up the following ingredients according to the following weight percentages, 68.5 wt % of the nylon 66, 10 wt % of the glass beads treated by the silane coupling agent, 10 wt % of the glass fiber powder treated by the silane coupling agent, 3 wt % of the first lubricating anti-wear agent (ultra-high molecular weight polyethylene), 3 wt % of the second lubricating anti-wear agent (PTFE), 4 wt % of the graft type toughening modifying agent, 1 wt % of the mixed antioxidant 1098/168 (weight ratio 1:1), 0.2 wt % of the lubricating dispersant (calcium stearate) and 0.3 wt % of the nucleating agent;

Step two: placing the above ingredients in a high speed mixing machine to mix the ingredients for 5 minutes and thereby form a mixture, and then transferring the mixture to a twin-screw extruder to extrude and granulate the mixture at a processing temperature of 250-265° C., the screw rotational speed of the twin-screw extruder being 600 rpm.

The present patent application further provides a high wear-resistant nylon 6/nylon 66 composite material and the preparation method thereof.

Embodiments 19-24

The high wear-resistant nylon 6/nylon 66 composite material includes a main material and a secondary material. The main material includes nylon 6, nylon 66 (PA66), glass beads (GB), glass fiber powder (GF) and lubricating anti-wear agent. The high wear-resistant nylon 6/nylon 66 composite material consists of the following components and their weight percentages are shown in Table 7.

TABLE 7

| | Formulas 19-24 | | | | | |
|---|---|---|---|---|---|---|
| Ingredient Name | Formula 19 (wt %) | Formula 20 (wt %) | Formula 21 (wt %) | Formula 22 (wt %) | Formula 23 (wt %) | Formula 24 (wt %) |
| Nylon 6 (PA6) | 18 | 40 | 28 | 41 | 39 | 33 |
| Nylon 66 (PA66) | 42 | 40 | 41 | 28 | 30 | 40 |
| Glass beads (GB) | 13 | 5 | 10 | 10 | 10 | 10 |
| Glass fiber powder (GF) | 14 | 6 | 10 | 10 | 10 | 10 |
| Ultra-high molecular weight polyethylene (UHMWPE) | 7 | 0 | 6 | 0 | 3 | 3 |
| PTFE | 0 | 5 | 0 | 6 | 3 | 3 |
| Graft type toughening modifying agent (POE-g-MAH) | 5 | 3 | 4 | 4 | 4 | 0 |
| Antioxidant 1098/168 (1:1) | 0.5 | 0.5 | 0.5 | 0.5 | 0.5 | 0.5 |
| Lubricating dispersant (Calcium stearate) | 0.3 | 0.3 | 0.3 | 0.3 | 0.3 | 0.3 |
| Nucleating agent (P-20) | 0.2 | 0.2 | 0.2 | 0.2 | 0.2 | 0.2 |

In the above embodiments, the viscosity of the nylon 6 is 2.4, and the viscosity of the nylon 66 is 2.8; the glass beads and glass fiber powder are respectively non alkali glass beads and non alkali glass fiber powder whose surfaces are both treated by the silane coupling agent; the ultra-high molecular weight polyethylene is referred as a first lubricating anti-wear agent, and the PTFE is referred as a second lubricating anti-wear agent; the graft type toughening modifying agent is graft polymerization oligomer with polyolefin elastomer (POE) grafted unsaturated acid or acid anhydride with a melt index of 1.0-5.0 g/10 min and a graft rate of 0.5-1%. The antioxidant is a mixed system with hindered phenolic antioxidant and phosphite ester antioxidant. For example, the antioxidant is 1098/168 (weight ratio 1:1), wherein 1098 is N,N'-1,6-subhexyl-II-[3,5-di-tert-butyl-4-hydroxyphenyl propionamide], and 168 is tri (2,4-ditertrabutyl phenyl) phosphite ester. The lubricating dispersant is a stearate which is selected from the group consisting of calcium stearate, zinc stearate, aluminum stearate and any combination thereof. In the above embodiments, the lubricating dispersant is calcium stearate. The nucleating agent is calcium carboxylates with a long carbon chain as a main component, such as a commercially available nucleating agent P-20, and the P-20 may be produced by Clamant International Ltd. in Germany.

The above components are proportionately placed in a high speed mixing machine to be mixed for 5-10 minutes and thereby form a mixture, and then the mixture is sent out to a screw extruder to be extruded and granulated at a processing temperature of 235-280° C., and the screw rotational speed of the screw extruder is 400-600 rpm. The combination of the screws may be a specific combination that has a good dispersive characteristic.

TABLE 8

The heating temperature of various sections

| | sections | | | | | | | | |
|---|---|---|---|---|---|---|---|---|---|
| | a first section | a second section | a third section | a fourth section | a fifth section | a sixth section | a seventh section | an eighth section | a ninth section |
| the heating temperature (° C.) | 245 | 255 | 260 | 265 | 270 | 270 | 270 | 265 | 260 |

According to samples 19-24 prepared in embodiments 19-24, the mechanical performances of the samples 19-24 are tested and compared using ASTM standards.

TABLE 9

Test performance comparison

| Items | Sample 19 | Sample 20 | Sample 21 | Sample 22 | Sample 23 | Sample 24 |
|---|---|---|---|---|---|---|
| Tensile strength (Mpa) | 119 | 113 | 115 | 112 | 123 | 135 |
| Flexural strength (Mpa) | 160 | 149 | 155 | 151 | 165 | 178 |
| Impact strength at room temperature (J/M) | 105 | 83 | 92 | 99 | 119 | 65 |
| Wear coefficient | 0.14 | 0.22 | 0.2 | 0.21 | 0.13 | 0.11 |
| Heat deformation temperature (° C.) | 248 | 233 | 236 | 232 | 242 | 255 |

Embodiment 25

The present patent application further provides a preparation method of the high wear-resistant nylon 6/nylon 66 composite material. The preparation method includes the following steps:

Step one: weighing up the following ingredients according to the following weight percentages, 39 wt % of the nylon 6, 30 wt % of the nylon 66, 10 wt % of the glass beads treated by the silane coupling agent, 10 wt % of the glass fiber powder treated by the silane coupling agent, 3 wt % of the first lubricating anti-wear agent (ultra-high molecular weight polyethylene), 3 wt % of the second lubricating anti-wear agent (PTFE), 4 wt % of the graft type toughening modifying agent, 0.5 wt % of the mixed antioxidant 1098/168 (weight ratio 1:1), 0.2 wt % of the lubricating dispersant such as calcium stearate and 0.3 wt % of the nucleating agent;

Step two: placing the above ingredients in a high speed mixing machine to mix the ingredients for 5 minutes and thereby form a mixture, and then transferring the mixture to a twin-screw extruder to extrude and granulate the mixture at a processing temperature of 245-265° C., the screw rotational speed of the twin-screw extruder being 600 rpm.

The graft type toughening modifying agent is graft polymerization oligomer with polyolefin elastomer (POE) grafted unsaturated acid or acid anhydride. Further, the graft type toughening modifying agent is polyolefin elastomer (POE) grafted maleic acid anhydride with a melt index of 2 g/10 min and a graft rate of 0.5-1%.

Embodiment 26

The present patent application further provides another preparation method of the high wear-resistant nylon 6/nylon 66 composite material. The preparation method includes the following steps:

Step one: weighing up the following ingredients according to the following weight percentages, 33 wt % of the nylon 6, 40 wt % of the nylon 66, 10 wt % of the glass beads treated by the silane coupling agent, 10 wt % of the glass fiber powder treated by the silane coupling agent, 3 wt % of the graft type toughening modifying agent, 3 wt % of the first lubricating anti-wear agent (ultra-high molecular weight polyethylene), 3 wt % of the second lubricating anti-wear agent (PTFE), 0.3 wt % of the mixed antioxidant 1098/168 (weight ratio 1:1), 0.2 wt % of the lubricating dispersant (calcium stearate) and 0.5 wt % of the nucleating agent;

Step two: placing the above ingredients in a high speed mixing machine to mix the ingredients for 3 minutes and thereby form a mixture, and then transferring the mixture to a twin-screw extruder to extrude and granulate the mixture at a processing temperature of 245-275° C., the screw rotational speed of the twin-screw extruder being 550 rpm.

Embodiment 27

The present patent application further provides another preparation method of the high wear-resistant nylon 6/nylon 66 composite material. The preparation method includes the following steps:

Step one: weighing up the following ingredients according to the following weight percentages, 38.3 wt % of the nylon 6, 30 wt % of the nylon 66, 10 wt % of the glass beads treated by the silane coupling agent, 10 wt % of the glass fiber powder treated by the silane coupling agent, 3 wt % of the first lubricating anti-wear agent (ultra-high molecular weight polyethylene), 3 wt % of the second lubricating anti-wear agent (PTFE), 4 wt % of the graft type toughening modifying agent, 1 wt % of the mixed antioxidant 1098/168 (weight ratio 1:1), 0.2 wt % of the lubricating dispersant (calcium stearate) and 0.5 wt % of the nucleating agent;

Step two: placing the above ingredients in a high speed mixing machine to mix the ingredients for 5 minutes and thereby form a mixture, and then transferring the mixture to a twin-screw extruder to extrude and granulate the mixture at a processing temperature of 245-265° C., the screw rotational speed of the twin-screw extruder being 600 rpm.

Embodiments 28-33

A high wear-resistant nylon 6/nylon 66 composite material consists of the following components and their weight percentages are shown in Table 10.

TABLE 10

Formulas 28-33

| Ingredient Name | Formula 28 (wt %) | Formula 29 (wt %) | Formula 30 (wt %) | Formula 31 (wt %) | Formula 32 (wt %) | Formula 33 (wt %) |
|---|---|---|---|---|---|---|
| Nylon 6 (PA6) | 60 | 48 | 0 | 0 | 33 | 72 |
| Nylon 66 (PA66) | 0 | 32 | 78 | 69 | 40 | 0 |
| Glass beads (GB) | 16 | 5 | 9 | 12 | 12 | 5 |
| Glass fiber powder (GF) | 18 | 8 | 6 | 14 | 10 | 17 |
| Ultra-high molecular weight polyethylene (UHMWPE) | 4 | 2 | 0 | 0 | 5 | 5 |
| PTFE | 2 | 5 | 7 | 5 | 0 | 1 |

The above components are proportionately placed in a high speed mixing machine to be mixed for 5-10 minutes and thereby form a mixture, and then the mixture is sent out to a screw extruder to be extruded and granulated at a processing temperature of 235-280° C., and the screw rotational speed of the screw extruder is 400-600 rpm. The combination of the screws may be a specific combination that has a good dispersive characteristic.

Embodiments 34-41

A high wear-resistant nylon 6/nylon 66 composite material consists of the following components and their weight percentages are shown in Table 11.

TABLE 11

Formulas 34-41

| Ingredient Name | Formula 34 | Formula 35 | Formula 36 | Formula 37 | Formula 38 | Formula 39 | Formula 40 | Formula 41 |
|---|---|---|---|---|---|---|---|---|
| Nylon 6 (PA6) | 21 | 39 | 35 | 42 | 32 | 61 | 37.5 | 22 |
| Nylon 66 (PA66) | 42 | 40 | 37 | 28 | 39 | 10 | 32 | 41.5 |
| Glass beads (GB) | 13 | 5 | 6.7 | 10 | 10.8 | 9 | 9 | 12 |
| Glass fiber powder (GF) | 14 | 6 | 10 | 9 | 10 | 11.7 | 11.8 | 14 |
| Ultra-high molecular weight polyethylene (UHMWPE) | 7 | 0 | 3 | 3 | 4 | 5 | 2 | 3 |
| PTFE | 0 | 5 | 4 | 3 | 3 | 0 | 4 | 3.5 |
| Graft type toughening modifying agent (POE-g-MAH) | 3 | 5 | 4 | 4 | 0 | 3 | 3 | 3 |
| Antioxidant 1098/168 (1:1) | 0 | 0 | 0.3 | 1 | 1 | 0 | 0.5 | 0.5 |

TABLE 11-continued

Formulas 34-41

| Ingredient Name | Formula 34 | Formula 35 | Formula 36 | Formula 37 | Formula 38 | Formula 39 | Formula 40 | Formula 41 |
|---|---|---|---|---|---|---|---|---|
| Lubricating dispersant (Calcium stearate) | 0 | 0 | 0 | 0 | 0.2 | 0.3 | 0 | 0 |
| Nucleating agent (P-20) | 0 | 0 | 0 | 0 | 0 | 0 | 0.2 | 0.5 |

The above components are proportionately placed in a high speed mixing machine to be mixed for 5-10 minutes and thereby form a mixture, and then the mixture is sent out to a screw extruder to be extruded and granulated at a processing temperature of 235-280° C., and the screw rotational speed of the screw extruder is 400-600 rpm. The combination of the screws may be a specific combination that has a good dispersive characteristic.

The present patent application also provides a roller made from the high wear-resistant nylon 6 (PA6), nylon 66 (PA66), or nylon 6 (PA6)/nylon 66 (PA66) composite materials, and the roller is used for lifting platform devices in airport freight vehicles. As shown in FIG. 1, a through shaft hole 110 is defined in a center of the roller 110, and a rotation axis of the roller can be installed in the shaft hole 111. The roller 110 is fixed to an axis rack of the roller for transportation through the rotation axis of the roller. Front and rear ends 112 of the roller 110 are configured to have flat structures to match the other tracks. An outer surface 113 of the roller 110 has a frosted texture so as to increase the friction force between a bottom board of a container (and a container board) and the roller during the transportation of freights. The roller 110 made of nylon material is durable, and is not prone to be worn or to skid. The selection of the nylon materials in accordance with the present patent application is very reasonable. Especially, in any environment and weather, the roller can be used to transport freights under easy control. The friction force between the bottom board of the container (and the container board) and the roller during the transportation of freights is increased, so that the roller is not prone to skid, to produce noise during transportation, or to be worn. The roller is also environmentally friendly. The durability of the roller is good, the toughness and the stiffness of the roller are exceptionally strong, and the roller can withstand relatively large impact. In addition, besides that the composite material has skid resistance, the frosted texture of the outer surface of the roller can provide additional skid resistance. The roller is configured to avoid metal powder flaking off during the rotation between one metal member and another metal member thereby polluting the environment, and to avoid the metal powder entering human eyes and respiratory tracts thereby making damages to the human body. Further, the roller is configured to reduce the harsh sound and vibrational noise caused by the friction between one metal member and another metal member during transportation, and thereby to reduce the damage to human ears. Furthermore, the roller is of good quality and inexpensive.

It is to be understood that the high wear-resistant nylon 6 (PA6), nylon 66 (PA66), and nylon 6 (PA6)/nylon 66 (PA66) composite materials can also be used to make other products, which may be widely applied in automobiles, machinery equipment connectors, gears, oil field equipment, instruments and meters, textile equipment, electrical and electronic equipment, household appliances, and etc.

While the present patent application has been shown and described with particular references to a number of embodiments thereof, it should be noted that various other changes or modifications may be made without departing from the scope of the present patent application.

What is claimed is:

1. A high wear-resistant nylon composite material for rollers on an airport freight vehicle comprising:
    5-16 wt % of glass beads;
    6-18 wt % of glass fiber powder;
    5-7 wt % of lubricating anti-wear agent;
    18-41 wt % of nylon 6;
    28-42 wt % of nylon 66;
    3-5 wt % of graft toughening modifying agent;
    0.3-1 wt % of antioxidant;
    0.2-0.3 wt % of lubricating dispersant; and
    0.2-0.5 wt % of nucleating agent.

2. The high wear-resistant nylon composite material as claimed in claim 1, wherein the lubricating anti-wear agent is selected from the group consisting of ultra-high molecular weight polyethylene, PTFE (Polytetrafluoroethylene), and any combination thereof.

3. The high wear-resistant nylon composite material as claimed in claim 1, wherein the surfaces of the glass beads and the glass fiber powder are treated by a silane coupling agent.

4. The high wear-resistant nylon composite material as claimed in claim 1, wherein the graft toughening modifying agent is graft polymerization oligomer with polyolefin elastomer (POE) grafted unsaturated acid or acid anhydride, and the melt index of the graft toughening modifying agent is 1.0-5.0 g/10 min and the graft rate of the graft toughening modifying agent is 0.5-1%.

5. The high wear-resistant nylon composite material as claimed in claim 4, wherein the graft polymerization oligomer with polyolefin elastomer (POE) grafted unsaturated acid or acid anhydride is maleic anhydride grafted polyolefin elastomer (POE) with a melt index of 2 g/10 min and a graft rate of 0.8%.

6. The high wear-resistant nylon composite material as claimed in claim 1 wherein the antioxidant is a mixed system with hindered phenolic antioxidant and phosphite ester antioxidant.

7. The high wear-resistant nylon composite material as claimed in claim 6, wherein the mixed system with hindered phenolic antioxidant and phosphite ester antioxidant is N,N'-1,6-sub-hexyl-II-[3,5-di-tert-butyl-4-hydroxyphenyl propionamide] and tri (2,4-ditertrabutyl phenyl)phosphite ester having a weight ratio of 1:1.

8. The high wear-resistant nylon composite material as claimed in claim 1, wherein the lubricating dispersant is stearate.

9. The high wear-resistant nylon composite material as claimed in claim 8, wherein the stearate is selected from the group consisting of calcium stearate, zinc stearate, aluminum stearate and any combination thereof.

10. The high wear-resistant nylon composite material as claimed in claim 1, wherein the nucleating agent is a calcium carboxylates with a long carbon chain as a main component.

11. A preparation method of the high wear-resistant nylon composite material as claimed in claim 1, wherein the method comprising the following steps:

weighing up the following ingredients according to the following weight percentages, 18-41 wt % of nylon 6; 28-42 wt % of nylon 66; 5-16 wt % of glass beads; 6-18 wt % of glass fiber powder; 5-7 wt % of lubricating anti-wear agent; 3-5 wt % of graft toughening modifying agent; 0.3-1 wt % of antioxidant; 0.2-0.3 wt % of lubricating dispersant; and 0.2-0.5 wt % of nucleating agent; and placing the above ingredients in a high speed mixing machine to mix the ingredients and form a uniform mixture, transferring the mixture to an extruder to extrude and granulate the mixture at a processing temperature of 210-290° C.

\* \* \* \* \*